United States Patent
Sircar et al.

(10) Patent No.: US 11,256,837 B1
(45) Date of Patent: Feb. 22, 2022

(54) METHODS, SYSTEMS, AND COMPUTER PROGRAM PRODUCT FOR IMPLEMENTING AN ELECTRONIC DESIGN WITH HIGH-CAPACITY DESIGN CLOSURE

(71) Applicant: Cadence Design Systems, Inc., San Jose, CA (US)

(72) Inventors: Sourav Kumar Sircar, Noida (IN); Marc Heyberger, Mandelieu (FR); Manish Garg, Greater Noida (IN); Akash Khandelwal, Fremont, CA (US); Chunlong Pan, Fremont, CA (US); Ruchir Agarwal, Noida (IN); Anurag Saran, Noida (IN); Lalit Bharat, Greater Noida (IN); Namrata M Sadhankar, Noida (IN); Manish Bhatia, Ghaziabad (IN); Renuka Deshpande, Noida (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/946,666

(22) Filed: Jun. 30, 2020

(51) Int. Cl.
*G06F 30/33* (2020.01)
*G06F 30/327* (2020.01)
(Continued)

(52) U.S. Cl.
CPC ........ *G06F 30/327* (2020.01); *G06F 2119/06* (2020.01); *G06F 2119/12* (2020.01)

(58) Field of Classification Search
CPC ...... G06F 30/39; G06F 30/394; G06F 30/392; G06F 30/398; G06F 30/367; G06F 2119/12; G06F 30/3312; G06F 30/33; G06F 30/327; G06F 2111/12; G06F 30/3323; G06F 2117/08; G06F 30/331; G06F 2119/10; G06F 30/35; G06F 2111/04; G06F 30/30; G06F 30/34; G06F 2115/08; G06F 2111/20; G06F 12/06; G06F 12/08; G06F 15/7864; G06F 2111/06; G06F 2115/10; G06F 2119/06; G06F 3/033; G06F 30/20; G06F 30/27; G06F 8/34; G06F 9/3869;
(Continued)

(56) References Cited

U.S. PATENT DOCUMENTS 7,657,855 B1 * 2/2010 Manaker, Jr. ....... G06F 30/3312
716/113
8,095,900 B2 1/2012 Sircar et al.
(Continued)

OTHER PUBLICATIONS

Kahng et al., "Timing Closure", Chapter 8, (2011), *VLSI Physical Design: From Graph Partitioning to Timing Closure*, Springer.
(Continued)

*Primary Examiner* — Binh C Tat
(74) *Attorney, Agent, or Firm* — Vista IP Law Group, LLP

(57) ABSTRACT

Disclosed are methods, systems, and articles of manufacture for implementing an electronic design with high-capacity design closure. A reduced netlist may be generated for an analysis view of an electronic design based at least in part upon logic of interest in the analysis view. A closure may be performed based at least in part upon a union netlist, wherein the union netlist is generated from the reduced netlist. The electronic design may then be implemented based at least in part upon a result of the closure task.

20 Claims, 17 Drawing Sheets

(51) Int. Cl.
  *G06F 119/06* (2020.01)
  *G06F 119/12* (2020.01)

(58) Field of Classification Search
  CPC ...... G06F 30/00; G06F 30/337; G06F 30/396; G01R 31/3177; G01R 31/31912; H01L 23/481; G03F 1/70
  USPC .................................................. 716/100–108
  See application file for complete search history.

(56) References Cited

U.S. PATENT DOCUMENTS

| | | | | |
|---|---|---|---|---|
| 2010/0235799 | A1* | 9/2010 | Rice ........................ | G06F 30/39 716/118 |
| 2013/0125072 | A1* | 5/2013 | Newcomb ............... | G06F 30/30 716/107 |
| 2016/0378889 | A1* | 12/2016 | Moisiadis ............. | G06F 30/327 716/104 |
| 2016/0378905 | A1* | 12/2016 | Moisiadis ............. | G06F 30/327 716/104 |

OTHER PUBLICATIONS

Altera Corp., "Timing Closure Methodology for Advanced FPGA Designs", (Dec. 19, 2014).
Gandhi, P. et al., "Hierarchical Timing Analysis: Pros, Cons, and a New Approach", (Jun. 4, 2014), Cadence White Paper, date retrieved from Google.
Coudert, O., "Timing and Design Closure in Physical Design Flows", (Feb. 2002), Proceedings of the International Symposium on Quality Electronic Design, 2002.
Silvant, M., "How do you qualify netlist reduction and circuit extraction?", (Jan. 4, 2010), EETimes.
Shah, O., "Extraction Techniques for High-performance, High-capacity Simulation", (Sep. 2009), Synopsys White Paper.
Robertson, C., "Extraction Challenges Grow in Advanced Nanometer IC Design", (Jul. 21, 2015), Siemens Blog.
Cadence Design Systems Inc., "Quantus Extraction Solution", (Jul. 6, 2017), Cadence, Datasheet, date retrieved from Google.
Papadopoulos, P. et al., "Spiral inductor modeling for RFIC using RLCK model order reduction", (May 15, 1998), date retrieved from Google.
Yin, C. et al., "Spice Circuit Reduction for Speeding Up Simulation and Verification", (Jun. 13, 2019), Master's Thesis, Department of Electrical and Information Technology Lund University.

* cited by examiner

METHODS, SYSTEMS, AND COMPUTER PROGRAM PRODUCT FOR IMPLEMENTING AN ELECTRONIC DESIGN WITH HIGH-CAPACITY DESIGN CLOSURE

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. Many phases of physical design may be performed with computer aided design (CAD) tools or electronic design automation (EDA) systems. To design an integrated circuit, a designer first creates high level behavior descriptions of the IC device using a high-level hardware design language. An EDA system typically receives the high-level behavior description of the IC device and translates this high-level design description into netlists at various levels of abstraction using a computer synthesis process. A netlist describes interconnections of nodes and components on the chip and includes information of circuit primitives such as transistors and diodes, their sizes and interconnections, for example.

Prior to tapeout, design optimization, design closure, and signoff are performed to ensure that the electronic circuit, when eventually manufactured, will perform as designed. One of these important signoff tasks is the timing closure. Nonetheless, conventional approaches often fall short in failure to provide sufficiently accurate results within a reasonable period of time. For example, during signoff timing closure before design tape-out, designers often determine remaining timing violations that must be resolved in order to meet all the foundry criteria. In this context, a full flat timing analysis is performed to identify the violations in all corners/modes and then netlist changes are performed in ECO (Engineering Change Only) mode with full physical context to avoid any perturbation on the placement/routing.

Similarly, designers may desire or require to squeeze any extra milliwatts of power usually on the interface paths logic which were never well optimized at block level. In both examples, using current conventional implementation, the session that performs concurrent multi-mode multi-corner timing/power optimization, loading the full netlist and the full physical data, would easily consume more than one (1) Terabyte memory for any design having 100 million instances or more.

An integrated circuit designer may use a set of layout EDA (electronic design automation) application programs to create a physical integrated circuit design layout from a logical circuit design. The layout EDA application uses geometric shapes of different materials to create the various electrical components on an integrated circuit and to represent electronic circuit components as geometric objects with varying shapes and sizes. After an integrated circuit designer has created an initial integrated circuit layout, the integrated circuit designer then verifies and optimizes the integrated circuit layout using a set of EDA testing and analysis tools.

Nonetheless, with design size continuing to increase to few hundred million instances to one billion, conventional approaches are not be viable anymore. In order to avoid the huge memory peak stated above, customers have adopted complex hierarchical timing closure. The idea being to divide the full netlist into multiple smaller part and optimize timing/power on those independently. But that leads to sub-optimal quality of results, non-convergent timing closure situation and extra challenges to maintain full accuracy on the timing analysis. One of the causes is that to perform accurate timing/power optimization in an ECO (engineering change order) mode during final stage of design closure, conventional approach would load the entire netlist and map the full physical data to it, leading to memory usage explosion.

Therefore, there is a need for methods, systems, and computer program products for implementing an electronic design with improved design closure in a more accurate, efficient, and/or effective manner as well as to address at least the aforementioned issues and shortcomings.

SUMMARY

Disclosed are method(s), system(s), and article(s) of manufacture for implementing an electronic design with improved design closure in one or more embodiments. Some embodiments are directed at a method for implementing an electronic design with improved design closure. These embodiments may generate a reduced netlist for an analysis view of an electronic design based at least in part upon logic of interest in the analysis view. A closure may be performed based at least in part upon a union netlist, wherein the union netlist is generated from the reduced netlist. The electronic design may then be implemented based at least in part upon a result of the closure task.

To generate a reduced netlist, some of these embodiments determine the logic of interest based at least in part upon a first analysis, wherein the first analysis comprises a single-mode-single-corner analysis and further determine the reduced netlist based at least in part upon the logic of interest.

In some of the immediately preceding embodiments, a zone of interest may be generated around the logic of interest; and a forest zone may be generated for multiple zones of interest comprising the zone of interest around the logic of interest.

To generate the zone of interest, the logic of interest may be identified in the electronic design; and a node may also be identified in the logic of interest in the electronic design. In some embodiments, an instance or logic pertaining to the node may be added into the zone of interest based at least in part upon a result of the first analysis; and one or more side path parents of the logic of interest may be further added into the zone of interest.

In some of these embodiments, one or more levels of side path loads and/or one or more net stages pertaining to the one or more side path parents to the zone of interest; and one or more net stages pertaining to the one or more side path parents to the zone of interest.

To generate a forest zone, some embodiments make the first analysis for a first type of violation aware of a first impact of a second type of violation in at least one zone of interest in the multiple zones of interest. A first instance along a first path that connects at least two zones of interest of the multiple zones of interest may be added into the forest zone. In some embodiments, a "forest" described herein may be the same as a "forest" in graph theory. In these embodiments, a forest corresponds to an undirected graph where any two vertices are connected by at most one path. For example, given a set of trees, which may be the logic of interest and their side loads, the forest connection includes a set of edges that connects these trees. It shall be further noted that the references to "first," "second," etc. (e.g., "a first instance," "a second instance," etc.) may or may not indicate any order or sequence in a series as the ordinal numbers (e.g., "first," "second," "third," etc.) may normally mean. For example, these references may simply be used to distinguish one element from another element. For example, "a first instance" described immediately above is used to distinguish this particular instance from, for example, "a second instance" while the references to "first" and "second" do not explicitly or implicitly indicate any particular orders in a series.

In addition or in the alternative, some embodiments make the first analysis for the second type of violation aware of a second impact of the first type of violation in the at least one zone of interest or a different zone of interest in the multiple zones of interest. A second instance along the first path or a second path that connects the at least two zones of interest of the multiple zones of interest may be added into the forest zone.

In some embodiments, one or more coupled net stages may be added to the forest zone; and the union netlist, wherein the union netlist includes at least the forest zone may be stored in a non-transitory computer accessible storage medium.

To perform the closure task, some embodiments determine the union netlist, identify physical data or context data pertaining to the reduced netlist or the union netlist, and identify a missing portion in the reduced netlist or in the union netlist. The union may be done across multiple single-corner-single-mode analyses.

In some of these embodiments, a placement obstruction may be generated for the missing portion based at least in part upon corresponding physical data of the physical data or corresponding context data of the context data pertaining to the mission portion; and logical data and at least some of the physical data may be identified into or provided to an analysis engine.

In some of the immediately preceding embodiments, the closure task may be performed at least by performing a second analysis with at least the union netlist at the analysis engine, wherein the second analysis comprises a multi-mode-multi-corner analysis. A second analysis result may be generated based at least in part upon a first result of the first analysis and the placement obstruction. The closure task may be performed based at least in part upon the second analysis result.

Some embodiments are directed at a hardware system that may be invoked to perform any of the methods, processes, or sub-processes disclosed herein. The hardware system may include at least one microprocessor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

Additional and other objects, features, and advantages of the disclosure are described in the Detail Description, figures, and claims.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present disclosures briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
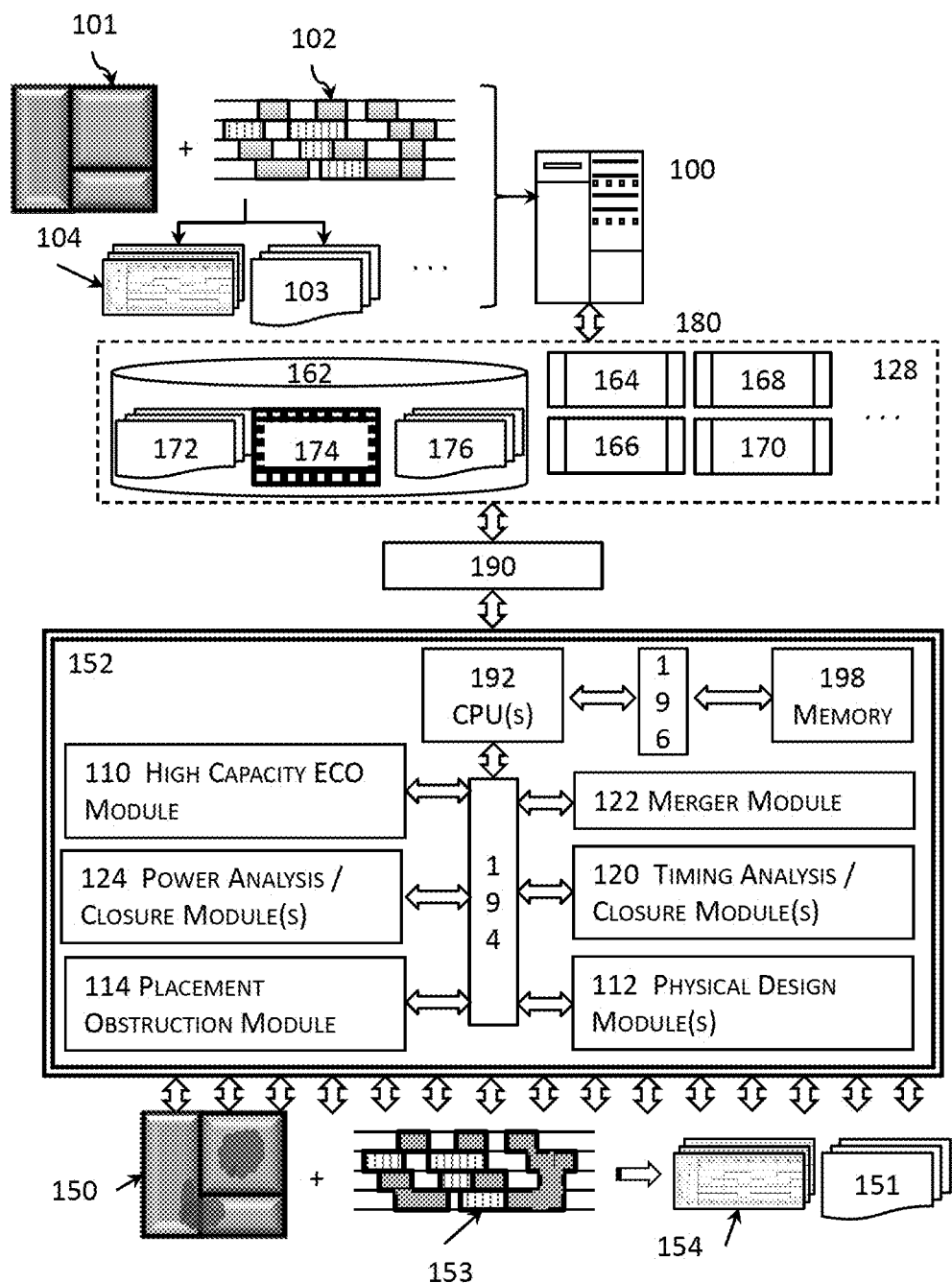
FIG. 1 illustrates a high-level block diagram of a simplified system for implementing an electronic design with high-capacity design closure in one or more embodiments.

Various embodiments described herein are directed to implementing an electronic design with high-capacity design closure. More specifically, this disclosure describes improved techniques for implementing an electronic design (e.g., a gigascale integration (GSI) electronic design having one billion or more transistors) that is to be manufactured with fabrication processes having a large number of process variables, each or some of which may exhibit a process variation. Some embodiments employ massive data size reduction while achieving equal or better accuracy than state-of-the-art techniques.

For various optimization or closure tasks (e.g., a timing analysis or closure task, a power analysis or closure task, etc.), some embodiments receive an initial netlist and generate a smaller, reduced netlist having one or more zones of interest for the user. That is, the smaller, reduced netlist in these embodiments includes either only the logic part of a timing violated zone or the logic selected by the user for further timing/power optimization. In addition or in the alternative, certain embodiments may merge multiple partial netlists in order to create a union master netlist that covers all of these multiple partial netlists. Some of these embodiments further create, on-the-fly when loading the DEF (Design Exchange Format) files, one or more placement obstructions to model the part of the netlist that is missing in the smaller, reduced netlist so that accurate physical timing and/or power optimization ECO (Engineering Change Order) may take place.

To achieve accurate timing and/or power optimization in the ECO mode during the final stage of design closure, conventional approaches load the entire netlist and map the full physical data to the entire netlist, leading to memory usage explosion beyond the memory capacity of modern, state-of-the-art computing systems. Or user may adopt the approach of inaccurate budget-based hierarchical fixing, which leads to either over-fixing or under-fixing the timing violations, hence requiring multiple ECO iterations to converge to timing closure.

Some embodiments provide at least the same level of accuracy and quality of timing and/or power closure without the memory and runtime impact as in the aforementioned conventional approaches at least by loading a reduced netlist, which may include a union of a combination of a corner and a mode reduced netlist, and then by loading the physical data for that smaller portion of the entire design. In these embodiments, the memory gain or saving is not only from netlist memory saving (e.g., less memory footprint to accommodate the netlist) but also from the reduction in the memory utilization by various types of data such as physical data (e.g., placement and/or routing data), library data, timing constraints data, etc. that is associated with the reduced netlist may be used by a closure task.

One of the advantages of various embodiments described herein is the massive resource utilization reduction because the effective netlist size is drastically reduced to only one or more violating zones, hence instead of or rather than having, for example, 100 million instances to be processed, a design tool (e.g., an EDA or Electronic Design Automation tool) may only work on a few million instances. Some benchmark tests with not-yet-optimized code have demonstrated the reduction on memory utilization ranging from four (4) to five (5) times when compared to modern, state-of-the-art approaches. Further reductions can be attained by optimization of some of the software code to achieve further computing resource consumption.

Another advantage of various embodiments described herein is the large reduction in the netlist further result in much faster runtime because a design tool loads only a smaller portion of the entire design (and associated data) and hence maintains only a reduced database during timing/power optimization.

Yet another advantage of various embodiments is that there is no loss of accuracy despite the extremely aggressive reduction in the netlist because the reduced database for the reduced netlist in memory covers the one or more zones of interest entirely for optimization and/or design closure tasks (e.g., timing optimization/closure, power optimization/closure, design optimization/closure, etc.) Furthermore, an additional advantage over conventional approaches is that some embodiments are made aware of the physical context and full timing information of the electronic design because these embodiments may use the timing information from a full flat timing graph to annotate the reduced netlist, and the remaining part of the netlist may be replaced by placement blockages to ensure integrity of the physical context.

As described above, various embodiments described herein provide the ability to generate, during a timing analysis from a full initial netlist, a reduced netlist having only one or more zones of interest (e.g., only the logic part of a timing violated zone, or only the logic selected by the user, or any combinations thereof) for further timing and/or power optimization. This results in multiple reduced netlists (e.g., one per each corner and mode combination). Then, in a concurrent multi-mode, multi-corner session, some or all of the multiple reduced netlists may be merged so as to form a union netlist that may be used to assemble only the required physical data needed or desired to perform physical-aware timing and/or power analysis or optimization only on the one or more zones of interest.

Some embodiments generate a reduced netlist having only the zone(s) of interest for the user, meaning either only the logic part(s) of a timing violated zone, and/or the logic selected by the user for further timing/power optimization. In addition or in the alternative, certain embodiments merge multiple partial netlists in order to create a union master netlist covering all of them. Some of these embodiments further create, on the fly during DEF (Design Exchange Format) loaded, placement obstructions to model the part of the netlist that is missing so that accurate physical timing/power optimization ECO (Engineering Change Order) may take place.

In some embodiments, an EDA tool (e.g., a timing closure engine) may invoke a single-mode, single corner analysis to perform a timing analysis for each of a plurality of combinations of a mode and a corner. This analysis may produce a timing analysis result (e.g., a full timing graph) and may save a reduced netlist based at least in part upon the timing analysis result.

These embodiments enabled in the first timing analysis or closure session may generate a reduced netlist based at least in part on a timing violation and/or based at least in part on one or more user-defined path groups. This is may be done during a full flat timing analysis in a single mode single corner mode. In some cases, there may be tens or even hundreds of such sessions running independently of each other in parallel over a farm of physical and/or virtual machines. In some of these embodiments, the logic part of interest from the netlist (LoI) may be identified. Furthermore, a cut out of the netlist may be performed in two or more consecutive phases: (a) create one or more logic zones around the selected Logic of Interest (LoI); and (b) create forest zone around disconnected logic zones.

Regarding creating one or more logic zones, some embodiments may include the logic of interest (LoI). For example, for each timing node of the design, the netlist cutting determines whether it is violating (e.g., in setup/hold/driver) or it is selected by a user through one or more path groups. These embodiments may then include that logic in the LoI zone. Moreover, one or more side path parents of the LoI, two or more levels of side path loads of LoI, and/or one or more coupled net stages of the LoI may be included.

These embodiments may collect some or all the instances that may be interconnecting two or more different logic zones, although those may be beyond a side path threshold (e.g., a two-level side path threshold). This may be done to ensure that during ECO timing closure for hold violation in one logic zone where an EDA tool determines the setup timing impact on one or more paths from one or more other logic zones, and vice-versa when the setup fix(es) may ensure no hold timing degradation.

In some embodiments involving one or more replicated hierarchies, an object may be marked as violated if it is violated in any of the master or clone instantiations. When some or all the reduced logic zones including their forest connection zones are identified based at least in part on the description above, an EDA tool may store the corresponding reduced netlist in a binary format, along with the full timing graph(s). In some of these embodiments, the full timing graph may be saved because a single view session may not necessarily be aware of what other reduced netlist(s) may be generated by the other single view session(s).

With the single mode, single corner analysis results determined, these embodiments may invoke a single timing closure engine instance executing in the multi-mode, multi corner analysis mode in some embodiments. This single timing closure engine instance may merge some or all the reduced netlists produced by the single-mode, single corner analysis into a merged reduced netlist, load the physical data from a database (e.g., a database storing DEF data), apply timing from the view-based timing graph to the merged reduced netlist, and perform a timing and/or power analysis, optimization, and/or one or more closure tasks in an ECO mode.

In these embodiments, a timing analysis or closure engine instance may merge some or all the reduced netlists that have been generated by the aforementioned single mode, single corner sessions and determine the corresponding physical data for the missing netlist components (e.g., netlist component that is not included in a reduced netlist generated by a single mode, single corner session).

In traditional approaches, there is one unique netlist on which user is running timing and/or power analysis, optimization, or closure in the Multi-Mode, Multi-Corner analysis mode. In contrast, a different netlist is generated for each view (which may be generated for each combination of a corner and a mode) because a violating zone may be view dependent. In some embodiments, there might be no timing violations or little timing violations in some views, while there might be many timing violations or different zones might be violated in timing in some other views.

In these embodiments, a netlist merging module may create a union master netlist that may cover each individual view-based netlist. This master netlist may be loaded in an EDA tool in place of a user provided initial netlist. In these embodiments, the physical contextual information may be provided through, for example, a DEF file. Unlike conventional approaches, a big part of the original or user-provided netlist may be missing in the union master netlist.

To compensate for missing netlist segments, some embodiments may use, for example, a DEF reader to generate placement blockages for some or all the instances which are present in DEF COMPONENTS section (or other data sources) but missing in the netlist either on the fly or in a batch processing mode. A DEF COMPONENTS section may have, for example, the cellname, location, orientation, etc. of a cell or component so a placement blockage having the same size as the cell size, with correct position, orientation, etc. may be generated in place of the actual cell or component. In addition or in the alternative, an EDA tool may merge a plurality of small blockages into a bigger rectilinear blockage rather than having the plurality of small blockages.

In these embodiments, the logical data (e.g., reduced netlist, timing libraries) and the physical data (e.g., LEF (Library Exchange Format), DEF (Design Exchange Format), and blockages, etc.) may be loaded in an ECO session. These embodiments may create a multi-mode, multi-corner timing graph. For example, an EDA tool may extract some or all the slew, delay, and/or slack information from a timing database that is generated earlier for a view and applies slew, delay, and/or slack information to the reduced netlist. The design may then be ready for timing and/or power analysis, optimization, and/or closure in an ECO mode. Due to the reduced netlist, the peak memory utilization and processor runtime to reach this stage are drastically, massively reduced.

Various embodiments will now be described in detail with reference to the drawings, which are provided as illustrative examples of the invention so as to enable those skilled in the art to practice the invention. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the invention. Further, various embodiments encompass present and future known equivalents to the components referred to herein by way of illustration.

Further, various embodiments encompass present and future known equivalents to the components referred to herein by way of illustration. It shall be noted that various features and techniques are described hereinafter in terms of embodiments and/or examples. Unless otherwise explicitly described as mutually exclusive, any embodiment, example, feature, and/or characteristic described herein may be readily combined in any suitable manner with any other embodiment, example, feature, and/or characteristic, without departing from the scope or spirit of the present disclosures. All such modifications are intended to be within the scope of claims associated with this disclosure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems have not been shown or described in detail to avoid unnecessarily obscuring descriptions of the embodiments.

In addition, unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 illustrates a high-level block diagram of a simplified system for implementing an electronic design with high-capacity design closure in one or more embodiments. More specifically, the computing system 100 in FIG. 1 may comprise one or more physical computing systems or virtual machines 100, such as a general-purpose computer described in the System Architecture Overview section to implement one or more special proposes. The illustrative system in FIG. 1 may include an Internet-based computing platform providing a shared pool of configurable computer processing resources (e.g., computer networks, servers, storage, applications, services, a cloud environment, etc.) and data to other computers and devices in a ubiquitous, on-demand basis via the Internet. For example, one or more computing resources and/or modules illustrated in FIG. 1 may be located in a cloud computing platform where computing resources (e.g., storage resources, compute resources, etc.) are provided on an on-demand basis without direct active management by users in some embodiments.

In this system illustrated in FIG. 1, one or more computing systems 100 may invoke and execute various modules to identify a first input 101 (e.g., a view of an electronic design such as a single-mode-single-corner view, a simulation view, etc.) and optionally a second input 102 (e.g., an electronic design such as a schematic design, a flat or hierarchical layout, a portion thereof at one or more abstractions, or any combinations thereof, etc.) to generate a first set of outputs 103 (e.g., a set of reduced netlists) and/or 103 (e.g., full timing graphs, etc.) of an electronic design or a portion thereof (e.g., a cell, a MOSFET, etc.)

The one or more computing systems 100 may invoke and execute a plurality of modules 152, which are specifically programmed and stored at least partially in memory of and functions in conjunction with at least one microprocessor (e.g., a central computing unit, a virtualized microprocessor, etc. 192) or processor core of the one or more computing systems 100, to perform various functions to determine a merged view 150 (e.g., a merged netlist, a merged view from multiple views) and a reduced physical design 153 that may be further provided to an analysis module (e.g., a timing analysis and/or closure module 120 such as a multi-mode-multi-corner or MMMC analysis module) to generate a final timing result 154 (e.g., a timing graph) that may be associated with and/or annotated with the corresponding netlist 151.

The first input 101 and the optional second input 102 as well as the merged view 151 and/or the reduced physical design 153 may be provided to one or more modules in the plurality of modules 152 which may further execute one or more tasks for implementing the electronic design or the portion thereof with high-capacity design closure. For example, a timing analysis module or engine 120 may perform a timing analysis (e.g., a single-mode-single-corner or SMSC analysis) to characterize the timing behavior (e.g., a full timing graph) for the first input 101 (e.g., a view of the electronic design or a portion thereof for an SMSC analysis) and the optional second input 102 for the electronic design or a portion thereof.

The merged view 151 and/or the reduced physical design 153 may also be provided to one or more modules in the plurality of modules 152 which may further execute one or more tasks for further implementing the electronic design or the portion thereof with high-capacity design closure. For example, a timing analysis module or engine 120 may perform a timing analysis (e.g., an MMMC analysis) to characterize the timing behavior for the merged view 151 and the reduced physical design 153 for the electronic design or a portion thereof.

Some embodiments described herein may apply one or more levels of desire reduction techniques to reduce an original electronic design to a reduced electronic design (e.g., a reduced electronic design having only one or more zones of interest or logic of interest), a placement obstruction module or engine 114 may determine the size, shape, and/or location of an obstruction object for a portion of the electronic design that is not included in the reduced electronic design. In some embodiments, a placement obstruction module 114 may merge multiple, smaller obstruction objects into a single, larger obstruction object.

Moreover, the one or more computing systems 100 may execute a high-capacity ECO (engineering change order) module (110) that executes one or more ECO tasks to, for example, perform a fix (e.g., increase the drive strength of a buffer) for a violation identified by an analysis or a closure task for a gigascale electronic design. The one or more computing systems 100 may also execute one or more power analysis and/or closure modules 124 that perform power closure tasks as a part of the design closure process.

With the first input 101 and the optional second input 102, the one or more computing systems 100 may execute a merger module 122 to merge individual design objects into a merged design object. For example, a merger module 122 may merge multiple reduced netlists (e.g., a netlist having only one or more zones or logic of interest) into a union netlist. As another example, a merger module 122 may merge multiple views (e.g., a view for an SMSC analysis) into a union view.

The set of modules 152 may also include one or more physical design modules 112 such as a layout editor for editing a layout, a floor planning tool for generating floorplan(s) for an electronic design, a placement tool for placing circuit component designs into a layout, a routing tool for interconnecting circuit component designs placed by the placement tool or floorplanning tool, a physical verification tool (e.g., a DRC or design rule check tool, an LVS or layout versus schematic tool, an XOR or exclusive tool, an antenna check tool, an ERC or electrical rule check tool, etc.) for ensuring correct electrical and logical functionality and manufacturability, a logic synthesis tool, a clock inserting tool for clock wiring, a post-layout optimization tool for ensuring, for example, performance, noise, signal integrity, and/or yield meets the requirements, a DFM (design for manufacturability) tool to ensure manufacturability of an electronic design by, for example, inserting redundant and/or dummy via(s) and/or metal, diffusion, and/or polysilicon layer(s), an error checking tool for ensuring the mapping to logic is performed correctly, a tapeout and mask generation tool for transforming design data into mask data for photomasks, any other tools pertaining to the physical abstraction of an electronic design, or any combinations thereof. In some embodiments, one or more of these physical design modules 112 may be included as one or more corresponding general computing resources in 128.

The set of modules 152 may include or at least function in conjunction with a microprocessor 192 (e.g., a central processing unit or CPU) via a system bus 194 to access or invoke various modules in 152 in some embodiments. In these embodiments, a single microprocessor 192 may be included in and thus shared among more than one module even when the computing system 100 includes only one microprocessor 192. A microprocessor 192 may further access some non-transitory memory 198 (e.g., random access memory or RAM) via a data bus 196 to read and/or write data during the microprocessor's execution of processes.

In some embodiments, the one or more computing systems 100 may invoke various system resources such as the processor(s) or processor core(s), memory, disks, etc. The one or more computing systems 100 may also initiate or interact with other computing systems to access, via a computer bus architecture (e.g., a system bus, a control bus, a data bus, or any combinations thereof), various resources 128 that may comprise, for example, a floorplanner, a global routing engine, and/or a detail routing engine 164, a layout editor 166, a design rule checker 168, a verification engine 170, etc.

These various resources 128 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design.

For example, these various resources 128 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

Strictly as an example, the one or more signoff modules may individually or in conjunction with one or more other modules (e.g., a timing analysis and/or closure module 120, a placement obstruction module 114, a power analysis and/or closure module 124) perform one or more timing analyses, timing closure related tasks (e.g., silicon-accurate timing signoff, signal integrity analyses, etc.), power closure related tasks, and/or power analyses to ensure an electronic design meets power, performance, or any other requirements before tapeout. The one or more signoff modules may include one or more signoff parasitic extraction modules to provide silicon-accurate interconnect parasitic extraction and ensure first-pass silicon success, and one or more power signoff modules to perform various power integrity analyses, transistor-level electro-migration and IR-drop analyses, or other power and signal integrity analyses with SPICE-level accuracy or better accuracy with SPICE or SPICE-like simulations (e.g., FastSPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), electrical rule checks (ERC), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

Once sign-off and/or design closure is achieved, the electronic design is finalized for tapeout; and the electronic design is transmitted to mask fabrication equipment for mask preparation and mask writing to produce photomasks that are then used in the actual manufacturing of the electronic circuits represented by the electronic design.

The one or more computing systems 100 may further write to and read from a local or remote (e.g., networked storage device(s), virtualized storage resource(s), etc.) non-transitory computer accessible storage 162 that stores thereupon data or information such as, but not limited to, one or more databases (174) such as schematic design database(s) or physical design database(s), electronic circuit design specification database(s), techfiles (or technology files) for multiple manufacturing processes for fabricating an underlying electronic design, various statistics, various data, rule decks, various design rules, constraints, etc. (172), or other pertinent information or data (176) that may be used to facilitate the performance of various functions described herein.

In some embodiments, the computing system 100 may include the various resources 128 such that these various resources may be invoked from within the computing system via a network or a computer bus 190 (e.g., an internet session, an intranet session, a data bus 196 interfacing a physical or virtual microprocessor 192 and the non-transitory computer accessible storage medium 198 (e.g., memory) or a system bus 194 between a microprocessor 192 and one or more engines or modules in the various resources 128). In some other embodiments, some or all of these various resources may be located remotely from the computing system 100 such that the computing system may access the some or all of these resources via a computer bus 190 and one or more network components.

In some embodiments, the computing system 100 may include the various resources 128 such that these various resources may be invoked from within the computing system via a system bus 194 (e.g., a data bus interfacing a microprocessor 192 and the non-transitory computer accessible storage medium 198 or a computer bus 190 between a microprocessor 192 and one or more engines in the various resources 128). In some other embodiments, some or all of these various resources may be located remotely from the computing system 100 such that a computing system 100 may access the some or all of these resources via a computer bus and/or one or more network components.

Each of various modules and engines described herein may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 100 for execution.

Figure 2A:
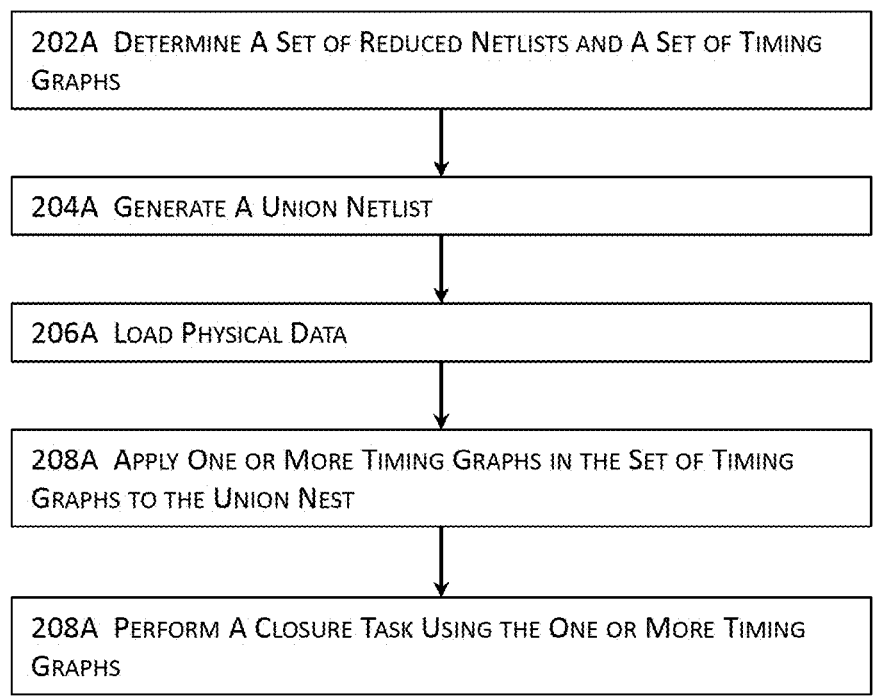
FIG. 2A illustrates a high-level flow diagram for implementing an electronic design with high-capacity design closure in one or more embodiments.

FIG. 2A illustrates a high-level flow diagram for implementing an electronic design with high-capacity design closure in one or more embodiments. These one or more embodiments determine a set of reduced netlists and a set of timing graphs at 202A for an electronic design or a portion thereof. In some embodiments, a set of reduced netlists and a set of timing graphs may be determined by performing a timing analysis. In some embodiments, an analysis may provide timing data for all hierarchical levels of the entire electronic design of interest with the input conditions. For example, a single-mode-single-corner (SMSC) timing analysis may be performed for each of a set of input timing analysis views. An SMSC timing analysis may include a full timing analysis in a single mode (e.g., for a base clock, for a function clock, etc.) for a particular corner that characterizes a specific operating condition (e.g., a specific process, a specific voltage or a specific level of voltage, a specific temperature or a specific level of temperature, or any combinations thereof).

A reduced netlist may be determined at 202A from, for example, the result of an analysis. In some embodiments where a timing analysis is performed on a netlist (e.g., a full netlist of an electronic design or a portion thereof), a reduced netlist may be determined at 202A by, for example, keeping only a smaller portion of the input netlist in the reduced netlist based at least in part upon the result of the timing analysis while the remaining portion of the input netlist may be discarded, suppressed, or hidden from further processing (e.g., subsequent analyses). For example, a zone of interest "ZoI" (or logic of interest "LoI") in the input netlist may be identified as a part of the reduced netlist when the corresponding timing analysis result for this zone or logic of interest shows exhibits one or more timing violations (e.g., hold violation of the minimum amount of time after the clock's active edge during which data must be stable, setup violation of the minimum amount of time before the clock's active edge that the data must be stable for it to be latched correctly, etc.)

Once a reduced netlist and timing analysis result is generated for each of a plurality of timing analysis views, a union netlist may be generated at 204A by merging the reduced netlists generated at 202A. For example, two different timing analysis views with, for example, different corners or modes may identify different zones of interest that may or may not overlap each other. A union netlist may then be generated by merging these two reduced netlists at 204A.

Physical data may be identified at 206A. The identified physical data may be In some embodiments, the types of physical data identified at 206A depends at least in part upon a subsequent closure task to be performed on the electronic design. The types of physical data identified at 206A may include, for example, LEF (library exchange format) data, DEF (design exchange format) data, layout data, parasitic data, blockage data, any other required or desired data, or any combinations thereof.

LEF data or an LEF file includes an abstract view of cells or instances in an electronic design and provides data about, for example, place-and-route boundary, pin positions, metal layer information, of a cell. DEF data or a DEF file includes, for example, the placement information of macros, standard cells, I/O (input/output) pins, and other physical entities.

In some embodiments, physical data for circuit component designs included in a reduced netlist or in the union netlist may be identified at 206A although circuit component designs in more than one reduced netlist may need to be identified once due to the availability of the union netlist. The physical data identified at 206A may be tagged in, annotated in, attached to, linked to, or otherwise associated with the corresponding circuit component designs. In some embodiments, physical data for circuit component designs excluded from a reduced netlist or from the union netlist may be identified at 206A. In some of these embodiments, physical data for both the included and excluded circuit component designs may be identified at 206A although it shall be noted that the physical design data identified for the included circuit component designs may be different from the physical design data identified for the excluded circuit component designs. For example, physical design data and/or parasitics may be identified for an included circuit component design while blockage data and/or LEF data may be identified for an excluded circuit component design at 206A.

A timing graph in a set of timing graphs determined at 202A may be applied to the union netlist at 208A. In some embodiments, the timing data in the timing graph may be associated with, tagged in, annotated in, attached to, or otherwise linked to the corresponding circuit component designs in the union netlist. Because the union netlist is determined from reduced netlists, the timing data used at 208A may represent a smaller subset of the full timing data in some embodiments.

With the union netlist generated at 204A and timing graph applied at 210A, a closure task may be performed using the timing data in the timing graph and the union netlist. One or more types of closure tasks such as a timing closure task, a power closure task, etc. may be performed at 210A.

Figure 2B:
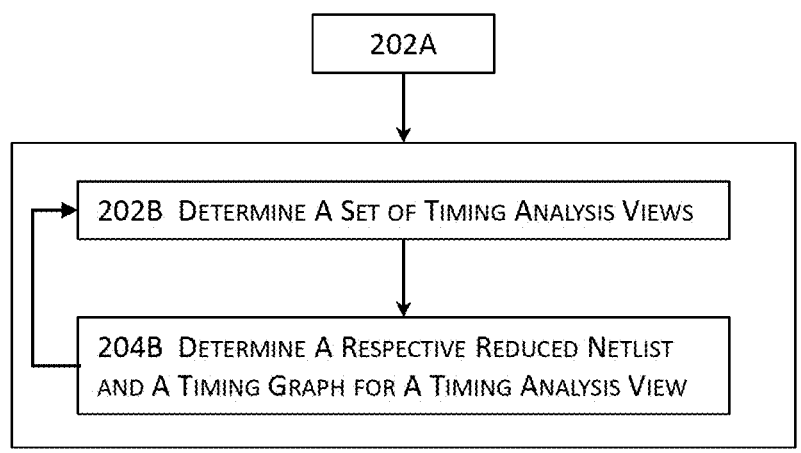
FIG. 2B illustrates more details about a portion of the high-level flow diagram illustrated in FIG. 2A in one or more embodiments.

FIG. 2B illustrates more details about a portion of the high-level flow diagram illustrated in FIG. 2A in one or more embodiments. More specifically, FIG. 2B illustrates more details of 202A in FIG. 2A. In some embodiments, a set of timing analysis views may be determined at 202B. For example, a set of SMSC timing analysis view may be determined for an electronic design of interest. For example, a static timing analysis (STA) view may be determined at 202B for a specific operating mode and a specific PVT (Process Voltage Temperature) corner or a specific parasitic corner.

In some embodiments, a corner may include a set of libraries that is characterized for process, voltage, and temperature variations to capture variations in the manufacturing process(es) along with expected variations in the voltage and temperature of the environment in which the electronic circuit being manufactured will operate. A mode, on the other hand, includes an operating model that may be defined by a set of clocks, supply voltages, timing constraints, and/or libraries and may even include annotation data (e.g., SDF or parasitics data) in some embodiments.

A timing analysis view may be identified from the set of timing analysis views determined at 202B. For this identified timing analysis view, a respective reduced netlist may be generated at 204B. A reduced netlist may be generated anew based on the original netlist by, for example, including only the portion of the original netlist that exhibit one or more timing violations, selected by a designer, or both in some embodiments. In some other embodiments, a reduced netlist may be modified from the original netlist by for example, suppressing, discarding, or otherwise ignoring the portion of the original netlist that exhibit no timing violations or other issues, is not selected by a designer, or both. Moreover, a netlist may be physical (e.g., instance-based) or logical (e.g., net-based). A netlist at the appropriate abstraction (e.g., logical or physical) may be used for different subsequent tasks to be performed for the electronic design. For purposes of design closure tasks, a netlist, a reduced netlist, and a union netlist referred to here is in the physical abstraction and is thus instance-based.

Figure 3A:
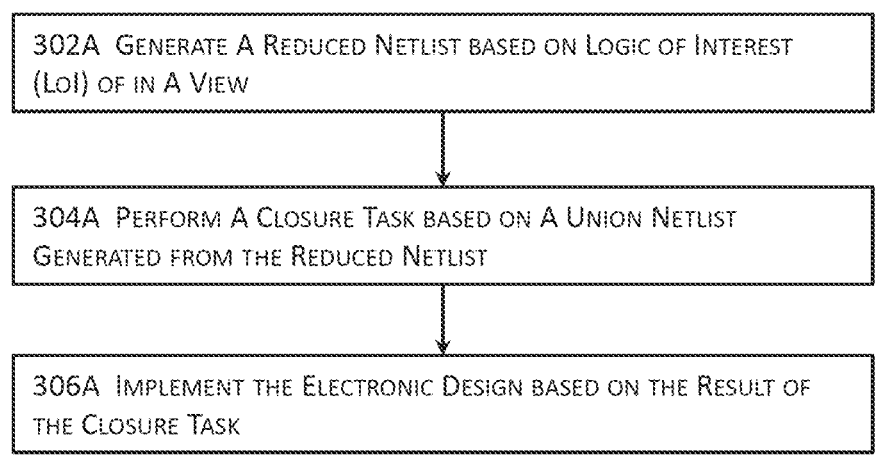
FIG. 3A illustrates another high-level flow diagram for implementing an electronic design with high-capacity design closure in one or more embodiments.

FIG. 3A illustrates another high-level flow diagram for implementing an electronic design with high-capacity design closure in one or more embodiments. These embodiments may first generate timing data and a reduced netlist based at least in part on a logic of interest at 302A. For example, these embodiments may first perform a timing analysis (e.g., a static timing analysis) on a timing analysis view to generate timing data such as a timing graph. The system and/or a designer may then identify logic of interest (LoI) based at least in part upon the timing data.

A reduced netlist may then be determined by including, for example, at least the logic of interest in the reduced netlist. More details about 302A will be described below with reference to FIG. 3B. The process may repeat to generate one or more additional reduced netlists by, for example, performing an identical or substantially similar timing analysis to generate respective sets of timing data and respective reduced netlists. Multiple timing analyses may thus be performed at 302A to generate a set of timing data and a set of reduced netlists. These multiple timing analysis sessions may be performed in series in some embodiments or in parallel in some other embodiments.

With the set of timing data and the set of reduced netlist generated at 302A, a closure task may be performed at 304B on a union netlist that is generated from at least some of the aforementioned set of reduced netlists. In some embodiments, the union netlist utilized in 304A does not necessarily include a portion of each reduced netlist of the set of reduced netlists generated at 302A because, for example, a timing analysis view may not always lead to the identification or determination of logic of interest or zone of interest. In some embodiments where no logic of interest is identified from a timing view, no reduced netlist will be generated, or no portions of the original netlist will be included in the union netlist.

A design closure task may be as simple as a linear set of discrete steps (e.g., a post-route optimization task followed by design manufacturability followed by one or more signoff checks on performance, reliability, yield, signal integrity, etc.) in some embodiments or a complex, iterative flow such as the aforementioned flow interspersed with engineering change order and repeated or iterative optimizations and/or checks.

In some embodiments, a multi-mode-multi-corner (MMMC) analysis may be performed at 304A as a part of the design closure task. An MMMC analysis sweeps through multiple corners across multiple operating modes.

Some examples of operating modes may include base clock, function clock, normal, sleep, scan shift, Jtag, etc. Some example PVT corners include WCS (worst case slow), typical, BCF (best case fast), etc. for operating conditions and maximal leakage (ML), TL (typical leakage), etc. for environment conditions. Some example parasitic corners or parasitic interconnect corners include typical, minimum C (capacitance), minimum RC (resistance capacitance), etc.

A WCS refers to worst case slow. For example, the process is slow (or slowest), the temperature is high or the highest, and the voltage is the low or lowest (e.g., the nominal voltage minus some margin like 10%) for nanotechnologies because timing delays may not always be smaller than the delays at high temperature due to temperature inversion. For example, a device threshold voltage margin with respect to the power supply may be reduced for nanotechnologies in some cases. In such cases, at low power supply, the delay of a lightly loaded cell or device may be higher at low temperatures than at the delay at high temperatures. This may be true of high threshold voltage (e.g., higher threshold, larger delay) or even standard threshold voltage (e.g., regular threshold, lower delay) cells or devices. This anomalous behavior of delays increasing at lower temperatures may be called temperature inversion.

A typical (TYP) multi-corner refers to the case where the process is typical, the temperature is nominal, and the voltage is nominal. A BCF multi-corner refers to the best-case fast case where the process is fast (or fastest), the temperature is low (or lowest), and the voltage is high (or the highest). A maximal leakage (ML) refers to the multi-corner case where the process is fast (or fastest), the temperature is the high (or highest), and the voltage is high (or highest or nominal voltage plus some margin). This corner may correspond to the maximal leakage power and/or the largest active power. A typical leakage (TL) refers to the corner where the process is typical, the temperature is high (or highest), and the voltage is nominal. A TL corner refers to a condition where the leakage is representative for most designs because the temperature may be higher due to power dissipated in normal operations.

Other examples such WCWR (worst case worst resistance), BCBR (best case best resistance), WCBR (worst case best resistance), BCWR (best case worst resistance), etc. may also be performed as a part of the closure task. In these corners, C and R generally refer to capacitance and resistance, respectively. B may refer to the best case that takes optimal value(w) (e.g., small delay numbers), whereas W may refer to worst case that takes pessimistic value(w) (e.g., large delays).

Timing checks may include tens of different checks. For example, a typical timing analysis may include 36 or more different timing checks (e.g., setup time, hold time, slew, clock gating check, etc.) Around 20 typical PVT corners may be checked with a typical of three to five clocks in an electronic design. The permutation could easily lead to many hundreds of timing analysis views for a regular electronic design. With each timing view requiring about 100-250 GB (gigabytes) of memory, a regular electronic design may easily consume over one terabytes (TB) of memory space which most, if not all, of the state-of-the-art computing systems cannot provide. Various techniques described herein perform the timing analysis for these hundreds of timing analysis views in a parallel paradigm to alleviate the time-consuming and resource-consuming tasks for generating full timing data (e.g., timing graph) upon which reduced netlists are respectively determined and then generate a union netlist from these reduced netlist and perform a multi-mode-multi-corner analysis on the union netlist to facilitate a much more expedient and at least equally accurate result.

With the closure task performed, the electronic design may be implemented at 306A based at least in part upon the result of the closure task and one or more closure constraints. For example, some embodiments may perform an ECO on the electronic design to perform one or more fixes to correct the errors or violations of a closure constraint during the closure task. This process may or may not necessarily return to 304A to perform at least a portion of the closure task to determine if further errors or violations are identified. Once all the closure constraints are satisfied, the design data of the underlying electronic design may be transformed into photomask data for tapeout and mask generation.

Figure 3B:
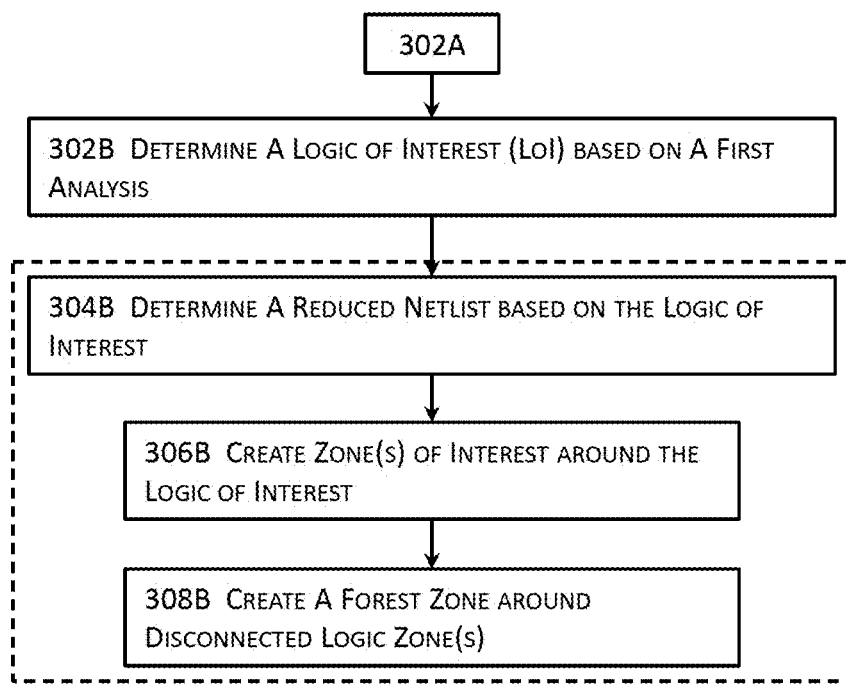
FIG. 3B illustrates more details about a portion of the high-level flow diagram illustrated in FIG. 3A in one or more embodiments.

FIG. 3B illustrates more details about a portion of the high-level flow diagram illustrated in FIG. 3A in one or more embodiments. More specifically, FIG. 3B illustrates more details about generating timing data and reduced netlists at 302A of FIG. 3A. In these one or more embodiments, a first timing analysis may be performed on a timing analysis view of the underlying electronic design with respect to a single operating mode and a single corner to generate timing data (e.g., a timing graph for the entire timing analysis view of the underlying electronic design). The first timing analysis may be a SMSC analysis in some embodiments.

Logic of interest may be determined at 302B based at least in part upon the result of the first timing analysis. For example, the system may identify the logic that exhibits a timing violation (e.g., a hold violation, a setup violation, etc.) or the logic that exhibits a timing behavior that does not yet amount to a violation but raises a concern with, for example, one or more constraints or requirements for the first timing analysis or for one or more additional, subsequent tasks or analyses. As another example, a user may also select some logic of interest (e.g., a critical part whose performance and/or reliability is of certain importance for the underlying electronic design) at 302B to include this logic of interest in one or more subsequent analysis. The process at 302B may be performed in series or in parallel for each timing analysis view in a set of timing analysis views to generate respective timing data and respective reduced netlist.

One or more zones of interest may be created at 306B around the logic of interest determined at 304B. A zone of interest includes the logic of interest and one or more additional circuit component designs and/or one or more additional paths. More details about creating a zone of interest will be described below with reference to FIG. 3C.

A forest zone may be further created at 308B around disconnected logic zones. A forest zone includes one or more additional circuit component designs and/or one or more additional paths that are not determined to belong to any logic zones. These one or more additional circuit component designs and/or one or more additional paths exhibit acceptable timing behaviors and are initially excluded from any logic zones but are subsequently added to the forest zone at 308B. More details about creating a logic zone will be described below with reference to FIG. 3D.

Figure 3C:
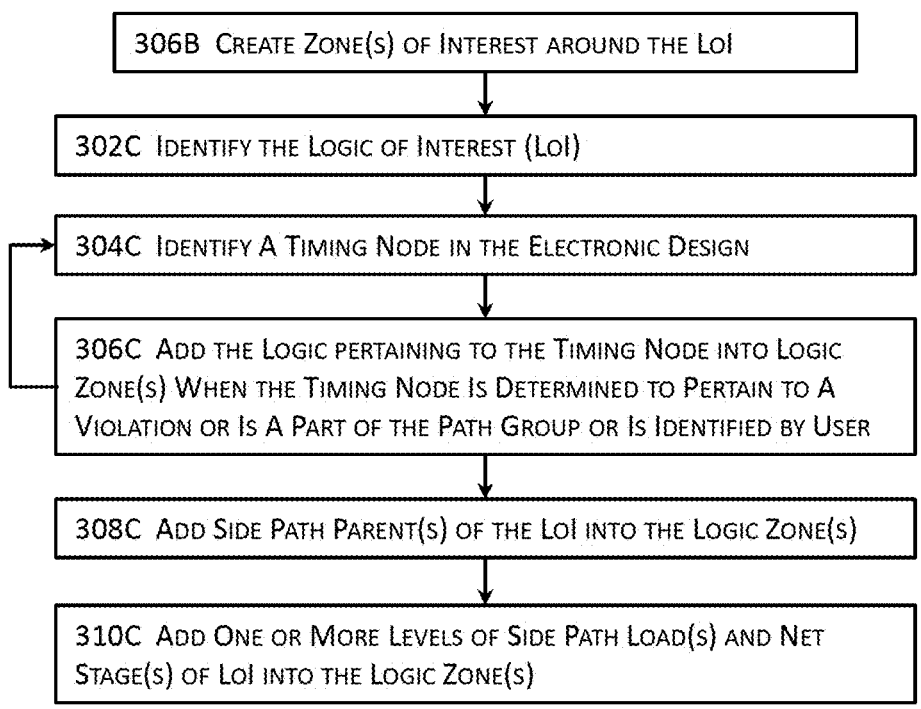
FIG. 3C illustrates more details about a portion of the high-level flow diagram illustrated in FIG. 3B in one or more embodiments.

FIG. 3C illustrates more details about a portion of the high-level flow diagram illustrated in FIG. 3B in one or more embodiments. More specifically, FIG. 3C illustrates more details about creating a logic zone around logic of interest at 306B of FIG. 3B. In these embodiments, an instance of logic of interest determined at 302B may be identified at 302C. The result of the first timing analysis performed on a timing analysis view may include zero or more instances of logic of interest.

A timing node pertaining to the instance of logic of interest may be identified at 304C. For example, a net or a net segment along which at least one device or circuit component exhibits a timing violation may be identified, and the at least one device or circuit component may be identified as the node of interest at 304C. In the example illustrated in FIG. 4A, the net or net segment 450A (collectively a "path group") including the first flipflop (402A), the buffer (404A), the AND gate (406A), the buffer (408A), and the second flipflop (410A) may be identified as logic of interest due to, for example, one or more timing violations revealed by the first timing analysis. Any of the circuit component designs or devices along the net or net segment 450A may be identified at 304C. In some embodiments, each of the circuit component designs or devices along the path group 450A may be identified at 304C.

Referring back to FIG. 3C. With the timing node identified at 304C, the logic or instance pertaining to the identified timing node may be added at 306C to a logic zone when the timing node is determined to pertain to a timing violation or is a part of the identified path group. The process may return to 304C to identify the next timing node, if available, until all such timing nodes have been similarly processed in the instance of logic of interest.

With a logic zone determined for the logic of interest at 306C, one or more side path parents of the logic of interest may also be added to the logic zone at 308C. A side path parent may include a side path that is connected to the path group in the zone of interest. A side path parent comprises a single circuit component design or device as well the interconnect that connects the single circuit component design or device to the path group in the zone of interest or to an immediately preceding side path parent.

Figure 4A:
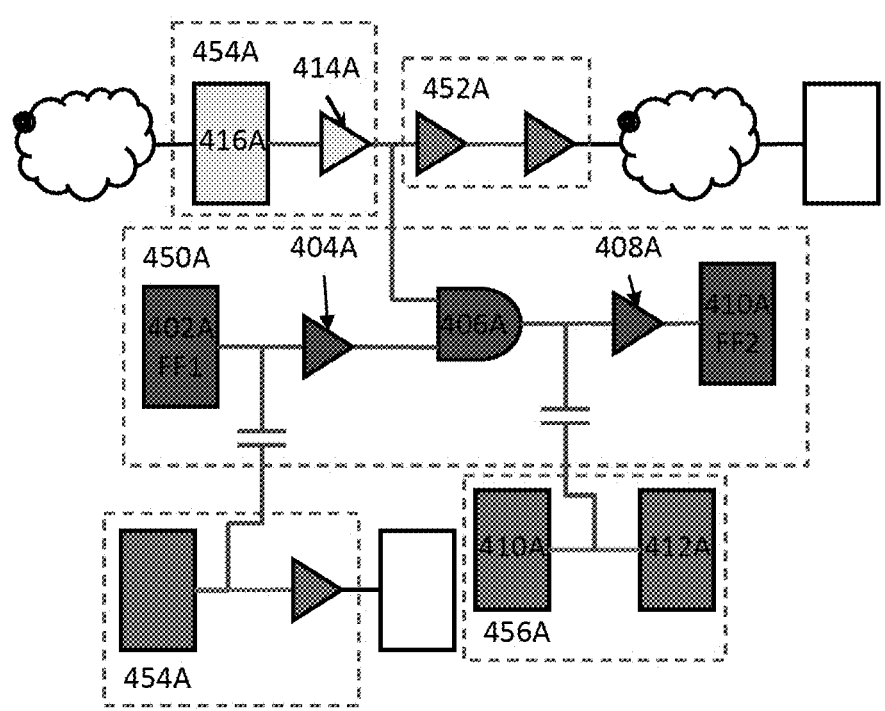
FIG. 4A illustrates a simplified schematic example of implementing an electronic design with high-capacity design closure in one or more embodiments.

In the example illustrated in FIG. 4A where the path group 450A is identified into the zone of interest, some embodiments may identify two side path parents which, when available, are either directly connected to the path group or indirectly connected to the immediately preceding side path parent. For example, the buffer 414A in the group of 454A is connected to the AND gate 406A in the zone of interest and is thus added to the zone of interest. Because this example illustrates the addition of two side path parents to the zone of interest, the flipflop 416A that is connected to the immediately preceding side path parent 414A is also added to the zone of interest. Additional circuit component designs or devices beyond the group 454A are not added to the zone of interest because in this example, only two side path parents are added to the zone of interest.

As another example, the flipflop 410A is connected to output of the AND gate 406A in the zone of interest and is thus also added to the zone of interest as the first side path parent. Similarly, the flipflop 412A is also connected to output of the AND gate 406A in the zone of interest and is thus also added to the zone of interest as the first side path parent to for another side path parent group 456A. The flop 412A is not directly connected to the AND gate 406A, but through the cross coupling in the RC of the net driven by the 406A o/p pin. For any net (N1) in the zone of interest, the RC cross coupled nets of N1 will be added to the zone as aggressor (we also call it cross coupled nets) net. But the aggressor nets of the pure forest net is not collected in the reduced netlist (as there will never be any delay calculation done on the pure forest nets). There are no further circuit component designs or devices beyond either flipflop 410A or 412A, and thus the process may turn to another timing node (e.g., 402A or 404A) to identify the flipflop and the buffer in the side path parent group 454A.

Similarly 454A is not the driver of 404A, but is the driver of the net which is RC cross coupled with the actual driver of 404A (which is FF 402A) The process may similarly identify the two buffers into the zone of interest as the side group parent group 452A.

Referring back to FIG. 3C. With the side path parents or parent groups added to the zone of interest at 308C, the corresponding side path loads and/or one or more coupled net stages may also be added into the zone of interest.

Figure 3D:
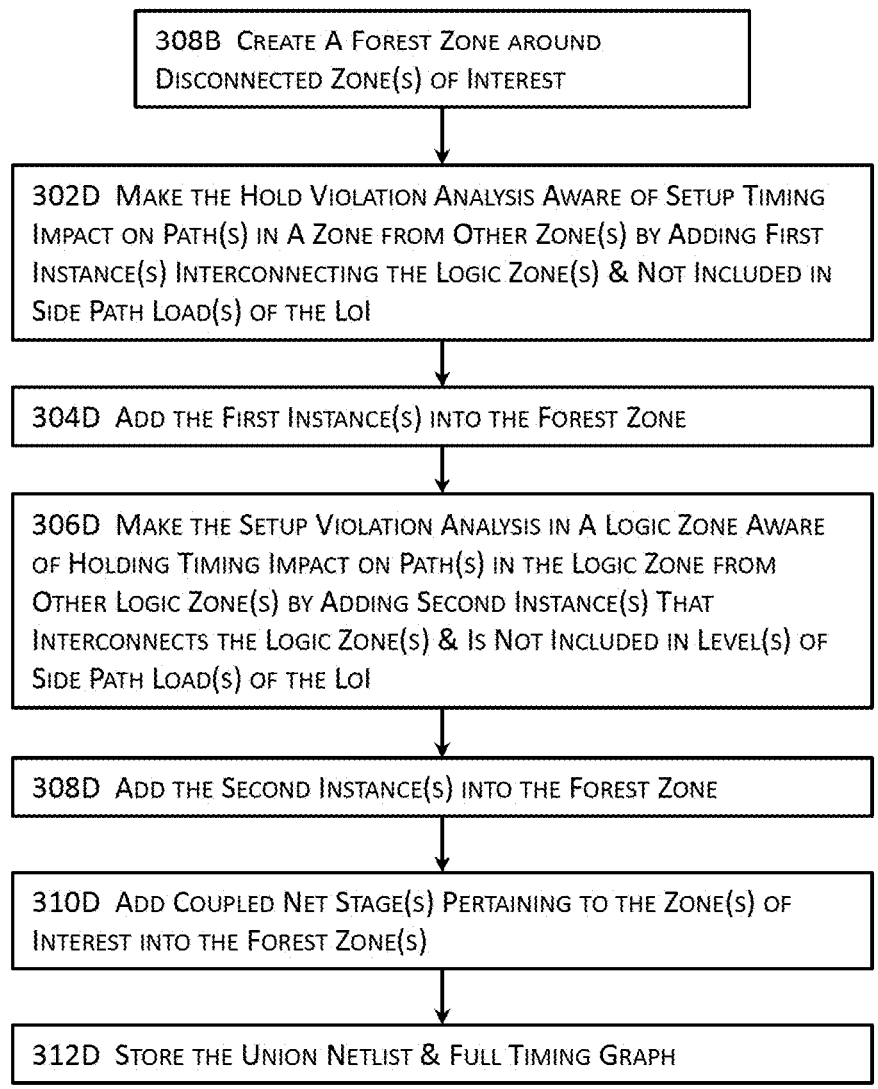
FIG. 3D illustrates more details about a portion of the high-level flow diagram illustrated in FIG. 3B in one or more embodiments.

FIG. 3D illustrates more details about a portion of the high-level flow diagram illustrated in FIG. 3B in one or more embodiments. More particularly, FIG. 3D illustrates more details about creating a forest zone around disconnected logic of interest or zones of interest. One of the purposes of a forest zone is to ensure that the timing analysis is made aware of the impact of a timing fix of one timing behavior type in one zone on paths other logic portions and vice versa so that the timing fix of one timing behavior type does not cause unacceptable degradation in another type of timing behavior (e.g., causing another violation of another timing behavior type) in the same or a different zone of interest. In generally, these one or more embodiments make a timing analysis aware of the timing impact on one of more paths in a zone of interest from one or more other portion(s) of the electronic design that is (are) not included in the zone of interest (e.g., not in the original instance of logic of interest or its side load parent group(s)) in the side path parent group(s).

In an example where two zones of interest have been identified at 306B, these one or more embodiments may make a hold violation analysis aware of setup timing impacts on one or both of these two zones of interest from other portion(s) of the electronic design at 302D. For example, a hold violation fix implemented in one zone of interest by an ECO may be further analyzed to determine the hold time constraint is satisfied by this fix. The hold violation analysis is made aware of its impact on one or more other timing behaviors (e.g., setup time) of instances of devices or circuit components in the same zone of interest or another zone of interest that is connected to the same zone of interest.

These other portions in the electronic design are not included in the zone of interest because, for example, their timing behaviors may have already conformed to the timing requirements, because these other portions are not identified by a designer as a zone of interest, or because these other portions are not identified as any side load parent groups. Nonetheless, these other portions are added to the forest zone that connects the two zones of interest at 304D because these other portions connect the two zones of interest, and one timing violation of one type in one zone may have a timing impact of the same or different type on the other zone of interest.

Figure 4B:
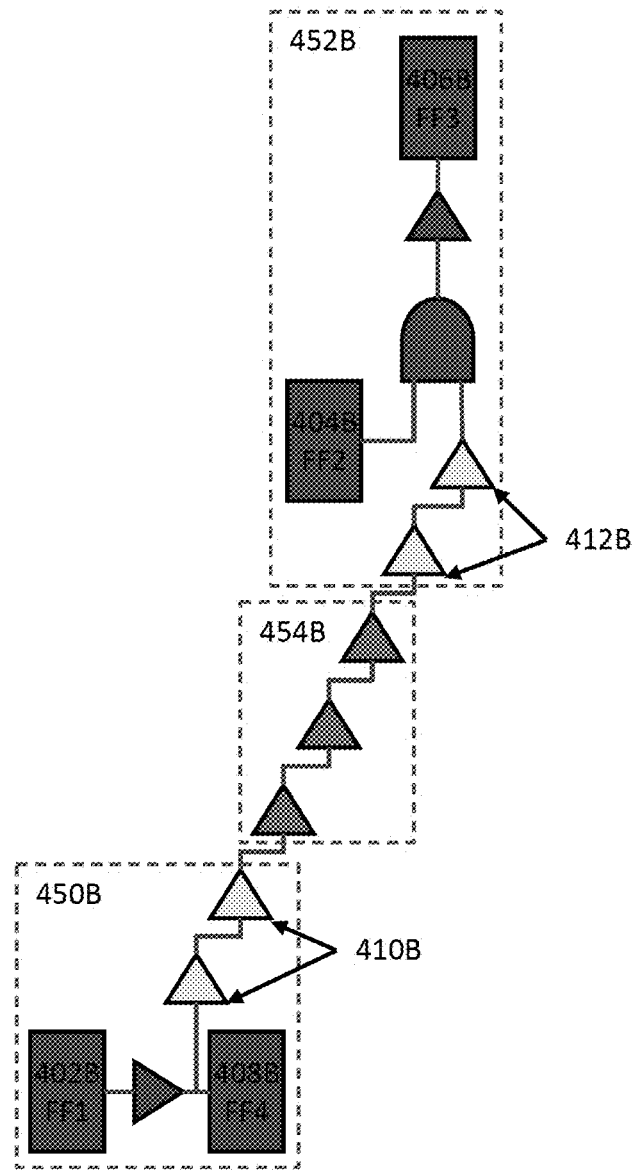
FIG. 4B illustrates another simplified schematic example of implementing an electronic design with high-capacity design closure in one or more embodiments.

Referring to FIG. 4B that includes two zones of interest 450B and 452B. In the zone of interest 450B, the logic of interest or path group may be first determined (e.g., with the process described above with reference to FIG. 3C) to include the path group having the flipflop 402B, flipflop 408B, and the buffer in between. The two side path parents 410B may also be added to the zone of interest 450B when it is determined to add two side path parents connected directly or indirectly to the path group.

Similarly, in the zone of interest 452B, the logic of interest or path group may be first determined (e.g., with the process described above with reference to FIG. 3C) to include the path group having the flipflop 404B, flipflop 406B, the AND gate, and the buffer. The two side path parents 412B may also be added to the zone of interest 452B when it is determined to add two side path parents connected directly or indirectly to the aforementioned path group.

With these two zones of interest 450B and 452B, a timing violation of one type in, for example, zone 450B may have an impact on the timing behavior of the same or a different type in the zone of interest 452B, and vice versa. In some embodiments, the portion 454B, which does not exhibit any timing violation and is not selected by a user to become a zone or logic of interest, interconnects these two zones of interest 450B and 452B. As a result, the group 454B may be added into a forest zone that now includes both zones of interest 450B and 452B as well as the group 454B because the timing impact in one zone of interest may negatively affect the timing behavior of the other zone of interest. This group 450B may be referred to as forest connection logic.

Other factors for consideration when adding paths or circuit component designs into a forest zone includes, for example, whether these paths or circuit component designs may be needed during a fix of a timing violation, whether a fix of a timing violation of one type (e.g., setup time) in one zone may negatively affect the timing behavior of another type (e.g., degradation in hold time) in the other zone.

Referring back to FIG. 3D, these one or more embodiments may further make a setup violation analysis aware of hold timing impacts on one or both of these two zones of interest from other portion(s) of the electronic design at 306D. Similar to those other portions in 302D, these other portions in the electronic design are also not included in the zone of interest. Nonetheless, these other portions are added to the forest zone that connects the two zones of interest at 308D because these other portions connect the two zones of interest, and one timing violation of one type in one zone may have a timing impact of the same or different type on the other zone of interest.

For example, a setup violation fix implemented in one zone of interest by an ECO may be further analyzed to determine the setup time constraint is satisfied by this fix. The setup violation analysis is made aware of its impact on one or more other timing behaviors (e.g., hold time, slew, etc.) of instances of devices or circuit components in the same zone of interest or another zone of interest that is connected to the same zone of interest.

One or more coupled stages that is connected to the input(s) of one stage or the output(s) of the other stage (assuming signals propagated from one zone of interest to the other zone of interest via interconnections) may be added to a forest zone at 310D. The zone(s) of interest (including the side path parent(s)) and the forest connection zone(s) may be referred to as a forest zone. A reduced netlist or a union netlist having the forest zone(s) may then be stored at 312D.

Figure 3E:
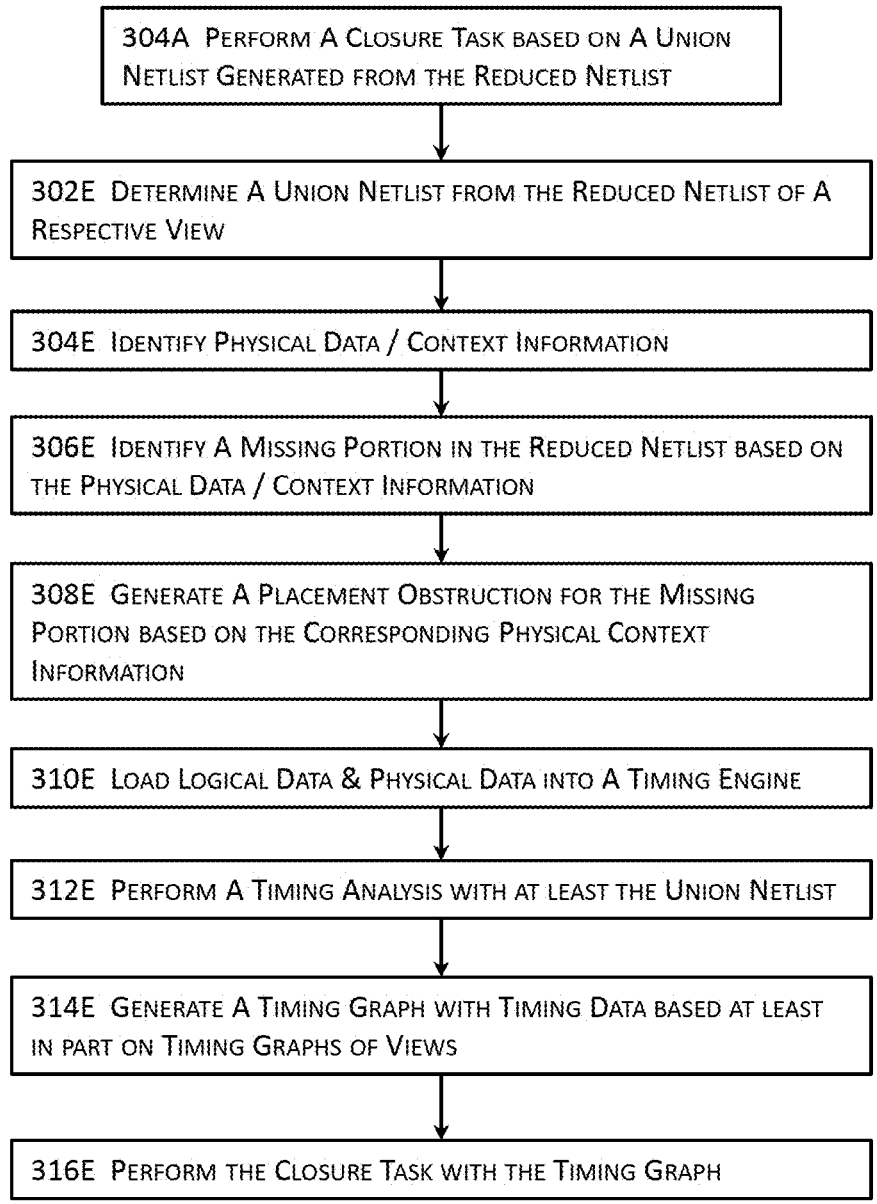
FIG. 3E illustrates more details about a portion of the high-level flow diagram illustrated in FIG. 3A in one or more embodiments.

FIG. 3E illustrates more details about a portion of the high-level flow diagram illustrated in FIG. 3A in one or more embodiments. More specifically, FIG. 3E illustrates more details about performing a closure task based a union netlist of 304A in FIG. 3A. At 302E, a union netlist may be determined. For example, a union netlist may be determined from a set of reduced netlists corresponding to a set of timing analysis views as described above. For example, LEF data or file(s), DEF data or file(s), blockage(s) may be identified at 302E. For example, place-and-route boundaries, pin positions, metal layer information, etc. of a cell, placement information of macros, standard cells, I/O (input/output) pins, and other physical entities, layout design data, parasitic data, blockage data, any other required or desired data, or any combinations thereof may be identified at 304E.

Because an original netlist is reduced to a reduced netlist for a timing analysis view, a missing portion that is not included in the reduced netlist may be identified may be identified at 306E. In some embodiments, a missing portion may be identified by comparing the instances that are present in, for example, a DEF file, a LEF file, or any other sources of data for the electronic design but not in the reduced netlist.

An LEF file is an ASCII (American Standard Code for Information Interchange) representation and may include library information for a class of designs such as layers, vias, placement site types, LEF technology information (e.g., placement and routing design rules, process information for layers, etc.), cell definitions, etc. A DEF file typically comprises information design-specific information of an electronic circuit and is also an ASCII representation that conveys logical design data (e.g., internal connectivity or netlist, grouping information, physical constraints, etc.) to, and physical design data (e.g., placement locations and orientations, routing geometry data, etc.) from, place-and-route tools. A DEF file may also include information such as the names, locations, orientation, etc. of instances. In these embodiments, physical data and/or context information (e.g., boundary information) of a missing instance in the reduced netlist may be also be identified for a missing instance in the reduced netlist at 306E.

With the mission portion identified at 306E, a placement obstruction or blockage may be created at 308E for the missing portion based at least in part upon the corresponding physical data and/or context information of the missing portion. For example, an instance may be identified at 306E to be missing in a reduced netlist. The physical data including, for example, the placement boundary and pin location(s) for this missing instance may also be identified from the physical data and/or context information identified at 304E. A blockage may then be generated at 308E for this missing instance. In some embodiments, the pin locations along the boundary of the missing instance may also be identified and added to the blocked so that the blockage may be interconnected at these pin locations to other portion of the electronic design in the reduced netlist. In some embodiments, multiple neighboring blockages may be merged into a single blockage, and the corresponding physical data (e.g., boundary data) may also be similarly adjusted to reflect the merger of these multiple neighboring blockages.

Once all the missing portion(s) is (are) similarly processed and replaced with blockage(s), the logical data and the physical data may be loaded into a timing engine at 310E. The logical data are identified for the circuit component designs in the reduced netlist. In comparison, the physical data may be identified for the circuit component designs in the reduced netlist as well as the blockage data for the missing portion(s) that is (are) not in the reduced netlist.

A timing analysis (e.g., an MMMC analysis) may be performed at 312E with at least the union netlist that now includes not only the instances from the set of reduced netlists but also blockages replacing those circuit component designs that are discarded during the generation of reduced netlists. Timing data may be generated at 314E with the timing analysis. In some embodiments the timing data so generated may include a timing graph based at least in part upon the timing data (e.g., slew, delay, slack, et.) from the timing data generated for each of the set of timing analysis views. A closure task may then be performed at 316E based at least in part upon one or more closure constraints using at least the timing data.

Figure 5A:
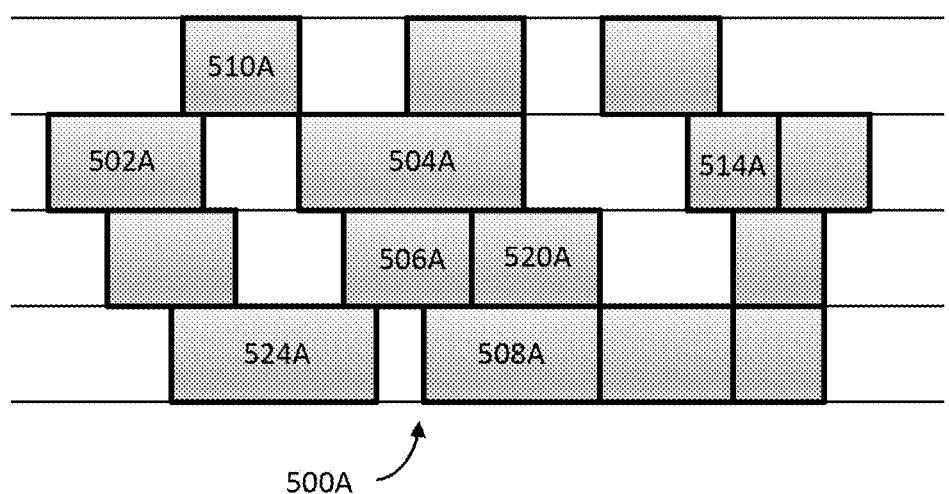
FIGS. 5A-5F illustrates simplified examples of implementing an electronic design with high-capacity design closure in one or more embodiments.

FIGS. 5A-5F illustrates simplified examples of implementing an electronic design with high-capacity design closure in one or more embodiments. FIG. 5A illustrates a simplified example of a portion 500A of a physical netlist having instances 502A, 504A, 506A, 508A, 510A, 514A, 520A, and 524A arranged in a number of rows as illustrated in FIG. 5A.

Figure 5B:
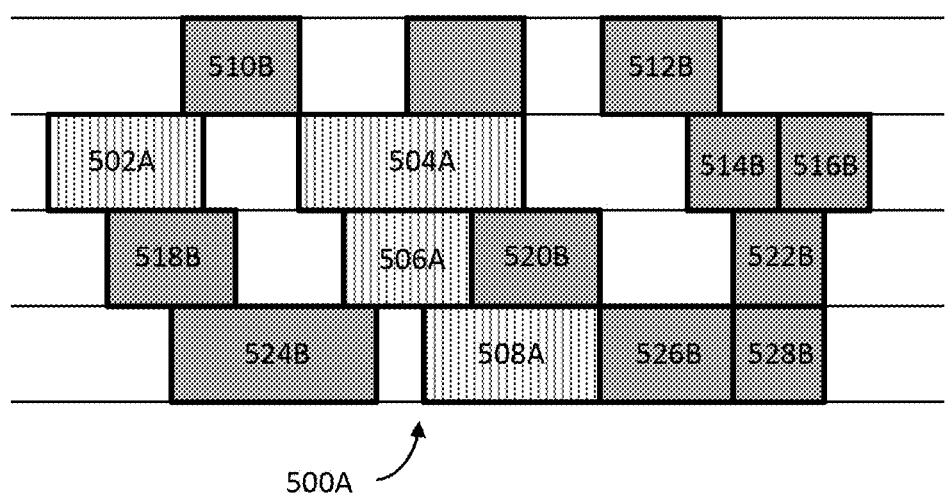

FIG. 5B illustrates a simplified example of the determination of a reduced netlist for the example netlist illustrated in FIG. 5A. More specifically, FIG. 5B illustrates the determination of, for example, two zones or logic of interest where the first logic of interest includes instance 502A, and the second logic of interest includes 504A, 506A, and 508A.

As described above, the determination of logic of interest may be based on timing data of a timing analysis and/or identification by a designer. In this example illustrated in FIG. 5B, the other instances (510B, 512B, 514B, 516B, 518B, 520B, 522B, 524B, 526B, and 528B) are not determined to belong to any logic of interest.

Figure 5C:
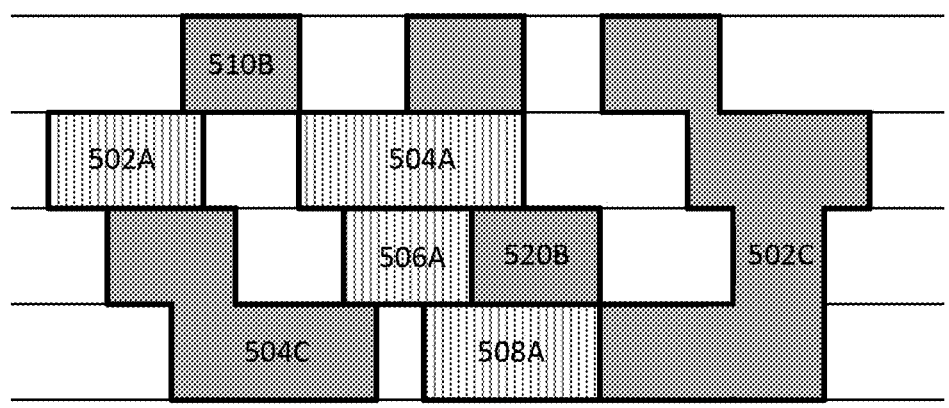

FIG. 5C illustrates a simplified example of a reduced netlist corresponding to the determination of logic of interest illustrated in FIG. 5B. As described above, the reduced netlist now includes instances 502A, 504A, 506A, and 508A, while the other instances (e.g., 10B, 512B, 514B, 516B, 518B, 520B, 522B, 524B, 526B, and 528B in FIG. 5B) are considered as missing from the reduced netlist. In some embodiments, the physical data (e.g., boundary and pin locations) for these missing instances may be identified and used to create placement obstructions or blockages (e.g., 510B and 520B) as described above. Moreover, some embodiments may further merge multiple neighboring blockages into a single blockage. As a result, the blockages for missing instances 518B and 524B in FIG. 5B may be merged into a first single blockage 504C, and the blockages for missing instances 512B, 514B, 516B, 522B, 526B, and 528B in FIG. 5B may be merged into a first single blockage 502C in FIG. 5C.

Figure 5D:
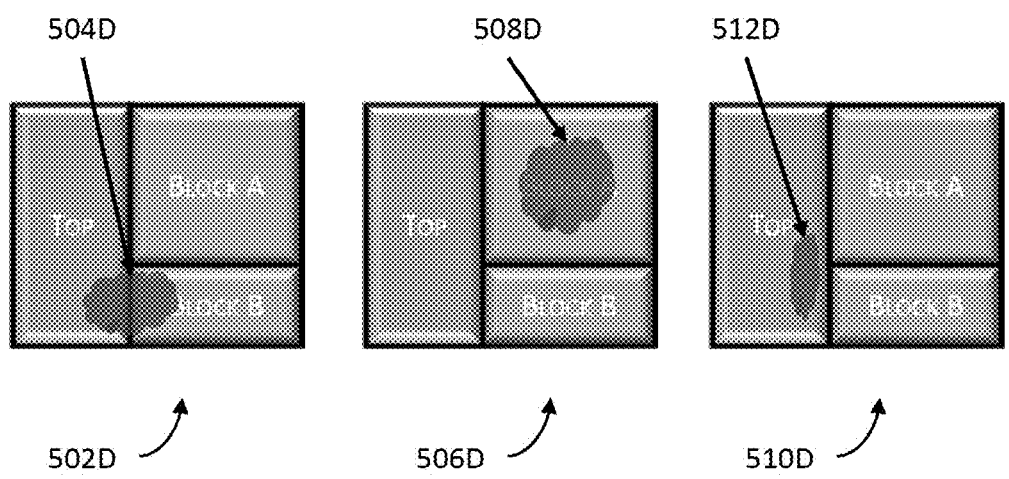

FIG. 5D illustrates another simplified example of creating a union netlist from individual netlists that are generated from corresponding timing analysis views. For example, an SMSC timing analysis is performed on a first timing analysis view of an electronic design and determines the first logic of interest 504D; the SMSC timing analysis is further performed on a second timing analysis view of the electronic design and determines the second logic of interest 508D; and the SMSC timing analysis is also performed on a third timing analysis view of the electronic design and determines the third logic of interest 512D.

A respective reduced netlist is generated based at least in part upon the timing data (e.g., a full timing graph) of the SMSC timing analysis for each corresponding timing analysis view. For example, a first reduced netlist 502D is generated for the SMSC timing analysis view including the first logic of interest 504D; a second reduced netlist 506D is generated for the SMSC timing analysis view including the second logic of interest 510D; and a second reduced netlist 510D is generated for the SMSC timing analysis view including the second logic of interest 512D.

Figure 5E:
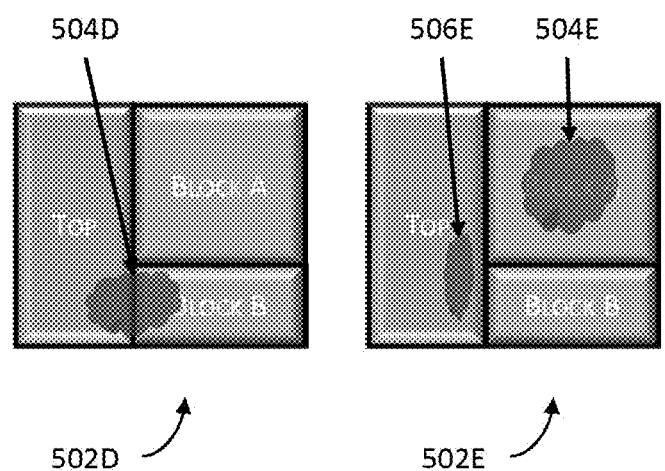

FIG. 5E illustrates a simplified example of merging two reduced netlist in some embodiments. In this simplified example, the second reduced netlist 506D including the second logic of interest 508D is merged with the third reduced netlist 510D including the third logic of interest 512D to form the merged netlist 502E including both the second logic of interest 506E (from the second logic of interest 508D in the second reduced netlist 506D) and the third logic of interest 504E (from the second logic of interest 512D in the second reduced netlist 510D).

Figure 5F:
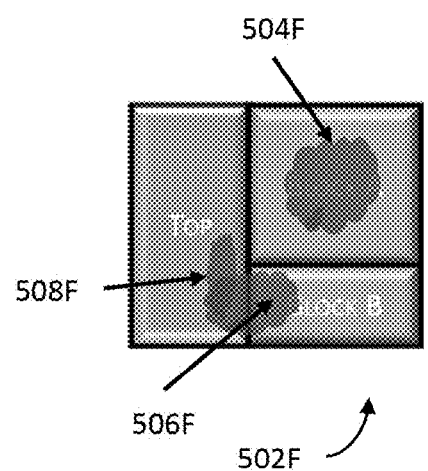

FIG. 5F illustrates another simplified example of merging two reduced netlist in some embodiments. In this simplified example, the merged netlist 502E including the second logic of interest 506E and the third logic of interest 504E is merged with the first reduced netlist 502D including the first logic of interest 504D to form a union netlist 502F. The union netlist 502F now includes the first logic of interest 506F (from the first logic of interest 504D in the first reduced netlist 502D), the second logic of interest 506E (from the merged netlist 502E in FIG. 5E), and the third logic of interest 504E (from the merged netlist 510D).

Various example embodiments of the disclosure are described herein. Reference is made to these examples in a non-limiting sense. Examples are provided to illustrate more broadly applicable aspects of the invention. Various changes may be made to various embodiments described herein and equivalents may be substituted without departing from the true spirit and scope of the invention. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosures. All such modifications are intended to be within the scope of claims associated with this disclosure.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure. The above description of illustrated embodiments is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one embodiment, the present subject matter may be implemented via Application Specific Integrated Circuits (ASICs), Field Programmable Gate Array (FPGA), etc. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" may be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein can be performed with variations. For example, many of the methods may include additional acts, omit some acts, and/or perform acts in a different order than as illustrated or described. Various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

System Architecture Overview

Figure 6:
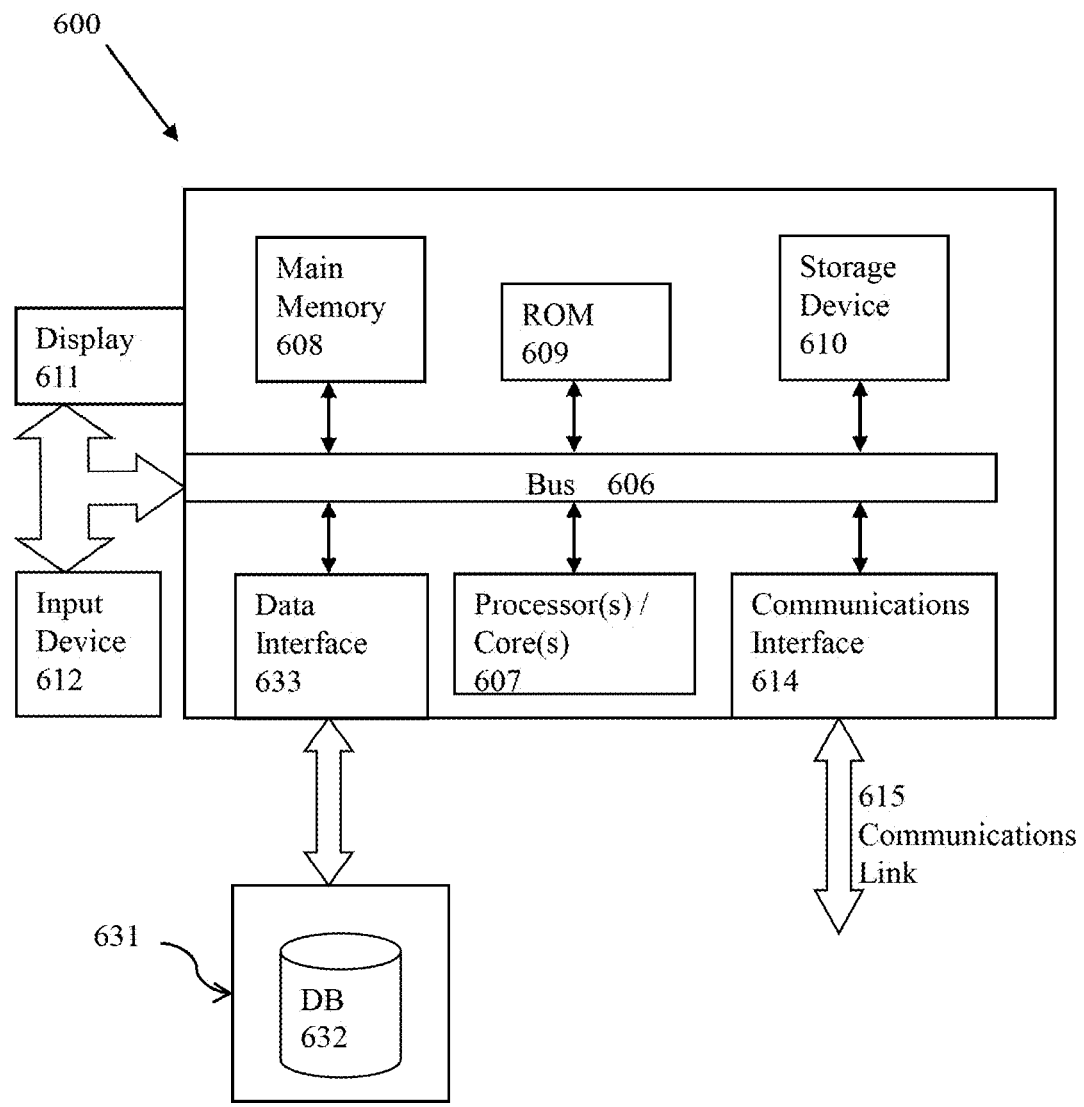
FIG. 6 illustrates a computerized system on which a process for implementing an electronic design with high-capacity design closure may be implemented.

FIG. 6 illustrates a computerized system on which a method for implementing an electronic design with high-capacity design closure may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

The illustrative computing system 600 may include an Internet-based computing platform providing a shared pool of configurable computer processing resources (e.g., computer networks, servers, storage, applications, services, etc.) and data to other computers and devices in a ubiquitous, on-demand basis via the Internet in some embodiments. For example, the computing system 600 may include or may be a part of a cloud computing platform (e.g., a public cloud, a hybrid cloud, etc.) where computer system resources (e.g., storage resources, computing resource, etc.) are provided on an on-demand basis, without direct, active management by the users in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, simulating, annotating, analyzing, optimizing, and/or identifying, etc. descried herein may be performed by one or more processors, one or more processor cores, or combination thereof.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

Various example embodiments of the invention are described herein. Reference is made to these examples in a non-limiting sense. The examples described herein are provided to illustrate more broadly applicable aspects of the invention. Various changes may be made to any of the examples or embodiments described herein, and equivalents thereof may be substituted without departing from the true spirit and scope of these examples or embodiments described herein.

In addition, many modifications may be made to adapt a particular situation, material, composition of matter, system, module, process, and/or process act(s) or step(s) to the objective(s), spirit or scope of the present disclosure. Further, as will be appreciated by those with skill in the art, each of the individual variations, examples, and/or embodiments, etc. described and illustrated herein has discrete components and features which may be readily separated from or combined with the feature or features of any of the other several variations, examples, and/or embodiments, etc., without departing from the scope or spirit of various variations, examples, and/or embodiments, etc. described herein. All such modifications are intended to be within the scope of claims associated with this disclosure. Moreover, various embodiments or portion(s) thereof described herein may be combined to provide further embodiments. Any aspects of the embodiments may be modified, if necessary, to employ concepts of the various variations, examples, and/or embodiments, etc. described herein to provide yet further embodiments.

We claim:

1. A computer implemented method for implementing an electronic design with high-capacity design closure, comprising:
   generating a reduced netlist from an input netlist for an analysis view of an electronic design at least by determining a smaller portion of a physical design database of the electronic design to be loaded into memory of a computing system for the high-capacity design closure based at least in part upon a logic of interest in the analysis view;
   generating a union netlist by merging the reduced netlist and a second reduced netlist, wherein the second reduced netlist corresponds to a second logic of interest and a second smaller portion of the physical design database of the electronic design;
   performing, at a processor of a computing system, a closure task at least by identifying a subset of the physical design database of the electronic design using the union netlist and loading the identified subset of the physical design database of the electronic design into the memory; and
   implementing the electronic design based at least in part upon a result of performing the closure task.

2. The computer implemented method of claim 1, wherein generating the reduced netlist comprises:
   determining the logic of interest based at least in part upon a first analysis, wherein the first analysis comprises a single-mode-single-corner analysis; and
   determining the reduced netlist based at least in part upon the logic of interest.

3. The computer implemented method of claim 2, wherein determining the reduced netlist further comprises:
   generating a zone of interest around the logic of interest; and
   generating a forest zone for multiple zones of interest comprising the zone of interest around the logic of interest.

4. The computer implemented method of claim 3, wherein generating the zone of interest comprises:
   identifying the logic of interest in the electronic design; and
   identifying a node in the logic of interest in the electronic design.

5. The computer implemented method of claim 4, wherein generating the zone of interest comprises:
   adding an instance or logic pertaining to the node into the zone of interest based at least in part upon a result of the first analysis; and
   adding one or more side path parents of the logic of interest into the zone of interest.

6. The computer implemented method of claim 5, wherein generating the zone of interest comprises:
   adding one or more levels of side path loads pertaining to the one or more side path parents to the zone of interest; and
   adding one or more net stages pertaining to the one or more side path parents to the zone of interest.

7. The computer implemented method of claim 3, wherein generating a forest zone for multiple zones of interest comprises:
   making the first analysis for a first type of violation aware of a first impact of a second type of violation in at least one zone of interest in the multiple zones of interest; and
   adding a first instance along a first path that connects at least two zones of interest of the multiple zones of interest into the forest zone.

8. The computer implemented method of claim 7, wherein generating a forest zone for multiple zones of interest comprises:
   making the first analysis for the second type of violation aware of a second impact of the first type of violation in the at least one zone of interest or a different zone of interest in the multiple zones of interest; and
   adding a second instance along the first path or a second path that connects the at least two zones of interest of the multiple zones of interest into the forest zone.

9. The computer implemented method of claim 8, wherein generating a forest zone for multiple zones of interest comprises:
   adding one or more coupled net stages to the forest zone; and storing, in a non-transitory computer accessible storage medium, the union netlist, wherein the union netlist includes at least the forest zone.

10. The computer implemented method of claim 2, wherein performing the closure task comprises:
   determining the union netlist;
   identifying physical data or context data pertaining to the reduced netlist or the union netlist; and
   identifying a missing portion in the reduced netlist or in the union netlist.

11. The computer implemented method of claim 10, wherein
   performing the closure task comprises:
   generating a placement obstruction for the missing portion based at least in part upon corresponding physical data of the physical data or corresponding context data of the context data pertaining to the missing portion; and
   identifying logical data and at least some of the physical data into an analysis engine.

12. The computer implemented method of claim 11, wherein performing the closure task comprises:
   performing the closure task at least by performing a second analysis with at least the union netlist at the analysis engine, wherein the second analysis comprises a multi-mode-multi-corner analysis;
   generating a second analysis result based at least in part upon a first result of the first analysis and the placement obstruction; and
   performing the closure task based at least in part upon the second analysis result.

13. A system for implementing an electronic design with high-capacity design closure, comprising:
   a microprocessor; and
   a non-transitory computer accessible storage medium storing thereupon a sequence of instructions which, when executed by the microprocessor, causes the microprocessor at least to:
      generate a reduced netlist from an input netlist for an analysis view of an electronic design at least by determining a smaller portion of a physical design database of the electronic design to be loaded into memory of a computing system for the high-capacity design closure based at least in part upon a logic of interest in the analysis view;
      generate a union netlist by merging the reduced netlist and a second reduced netlist, wherein the second reduced netlist corresponds to a second logic of interest and a second smaller portion of the physical design database of the electronic design;
      perform, at a processor of a computing system, a closure task at least by identifying a subset of the physical design database of the electronic design using the union netlist and loading the identified subset of the physical design database of the electronic design into the memory;
      implement the electronic design based at least in part upon a result of performing the closure task.

14. The system for claim 13, wherein the sequence of instructions further comprises instructions whose execution further causes the microprocessor to:
   determine the logic of interest based at least in part upon a first analysis, wherein the first analysis comprises a single-mode-single-corner analysis;
   determine the reduced netlist based at least in part upon the logic of interest;
   generate a zone of interest around the logic of interest; and
   generate a forest zone for multiple zones of interest comprising the zone of interest around the logic of interest.

15. The system for claim 14, wherein the sequence of instructions further comprises instructions whose execution further causes the microprocessor to:
   identify the logic of interest in the electronic design;
   identify a node in the logic of interest in the electronic design;
   add an instance or logic pertaining to the node into the zone of interest based at least in part upon a result of the first analysis;
   add one or more side path parents of the logic of interest into the zone of interest;
   add one or more levels of side path loads pertaining to the one or more side path parents to the zone of interest; and
   add one or more net stages pertaining to the one or more side path parents to the zone of interest.

16. The system for claim 14, wherein the sequence of instructions further comprises instructions whose execution further causes the microprocessor to:
   make the first analysis for a first type of violation aware of a first impact of a second type of violation in at least one zone of interest in the multiple zones of interest;
   add a first instance along a first path that connects at least two zones of interest of the multiple zones of interest into the forest zone;
   make the first analysis for the second type of violation aware of a second impact of the first type of violation in the at least one zone of interest or a different zone of interest in the multiple zones of interest;
   add a second instance along the first path or a second path that connects the at least two zones of interest of the multiple zones of interest into the forest zone;
   add one or more coupled net stages to the forest zone; and
   store, in a non-transitory computer accessible storage medium, the union netlist, wherein the union netlist includes at least the forest zone.

17. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing an electronic design with high-capacity design closure, the set of acts comprising:
   generating a reduced netlist from an input netlist for an analysis view of an electronic design at least by determining a smaller portion of a physical design database of the electronic design to be loaded into memory of a computing system for the high-capacity design closure based at least in part upon a logic of interest in the analysis view;
   generating a union netlist by merging the reduced netlist and a second reduced netlist, wherein the second reduced netlist corresponds to a second logic of interest and a second smaller portion of the physical design database of the electronic design;
   performing, at a processor of a computing system, a closure task at least by identifying a subset of the physical design database of the electronic design using the union netlist and loading the identified subset of the physical design database of the electronic design into the memory; and
   implementing the electronic design based at least in part upon a result of performing the closure task.

18. The article of manufacture of claim 17, the set of acts further comprising:
   determining the logic of interest based at least in part upon a first analysis, wherein the first analysis comprises a single-mode-single-corner analysis;
   determining the reduced netlist based at least in part upon the logic of interest;
   generating a zone of interest around the logic of interest; and
   generating a forest zone for multiple zones of interest comprising the zone of interest around the logic of interest.

19. The article of manufacture of claim 18, the set of acts further comprising:
   identifying a node in the logic of interest in the electronic design;
   adding an instance or logic pertaining to the node into the zone of interest based at least in part upon a result of the first analysis;
   adding one or more side path parents of the logic of interest into the zone of interest;
   adding one or more levels of side path loads pertaining to the one or more side path parents to the zone of interest; and
   adding one or more net stages pertaining to the one or more side path parents to the zone of interest.

20. The article of manufacture of claim 18, the set of acts further comprising:
   determining the union netlist;
   identifying physical data or context data pertaining to the reduced netlist or the union netlist;
   identifying a missing portion in the reduced netlist or in the union netlist;
   generating a placement obstruction for the missing portion based at least in part upon corresponding physical data of the physical data or corresponding context data of the context data pertaining to the missing portion;
   identifying logical data and at least some of the physical data into an analysis engine;
   performing the closure task at least by performing a second analysis with at least the union netlist at the analysis engine, wherein the second analysis comprises a multi-mode-multi-corner analysis;
   generating a second analysis result based at least in part upon a first result of the first analysis and the placement obstruction; and
   performing the closure task based at least in part upon the second analysis result.

\* \* \* \* \*